United States Patent [19]

Lissau, deceased

[11] Patent Number: 4,643,008
[45] Date of Patent: Feb. 17, 1987

[54] LOCK FOR FUEL FILLER CAP

[75] Inventor: Frederic Lissau, deceased, late of Chicago, Ill., by Edith Lissau, executrix

[73] Assignee: Sloan Valve Company, Franklin Park, Ill.

[21] Appl. No.: 708,359

[22] Filed: Mar. 4, 1985

[51] Int. Cl.$^4$ .............................................. B65D 55/14
[52] U.S. Cl. ......................................................... 70/167
[58] Field of Search ................ 70/158, 161, 168, 172, 70/364 R, 163–164, 165–167, 169, 14 171, 173; 292/DIG. 15, DIG. 47

[56] References Cited

U.S. PATENT DOCUMENTS 1,749,255  3/1930  McGhan ............................... 70/172
3,788,111  1/1974  Parlier ................................ 70/364 R
4,305,510  5/1983  Harper ............................... 70/364 R Primary Examiner—Robert L. Wolfe
Attorney, Agent, or Firm—Kinzer, Plyer, Dorn & McEachran

[57] ABSTRACT

A lock for a fuel filler cap has a cylindrical body with an axial keyway formed therein. A tumbler body is rotatably disposed in the cylindrical body. The tumbler mounts a plurality of tumbler pins which are slidable into and out of the keyway. The tumbler carries a locking cam, which is mounted eccentrically with respect to the tumbler axis of rotation. The locking cam is engagable in a friction fit with the interior diameter of the fuel filler neck. The sidewalls of the keyway are angled so as to present a wide mouth opening for the tumbler pins.

5 Claims, 9 Drawing Figures

U.S. Patent  Feb. 17, 1987  4,643,008
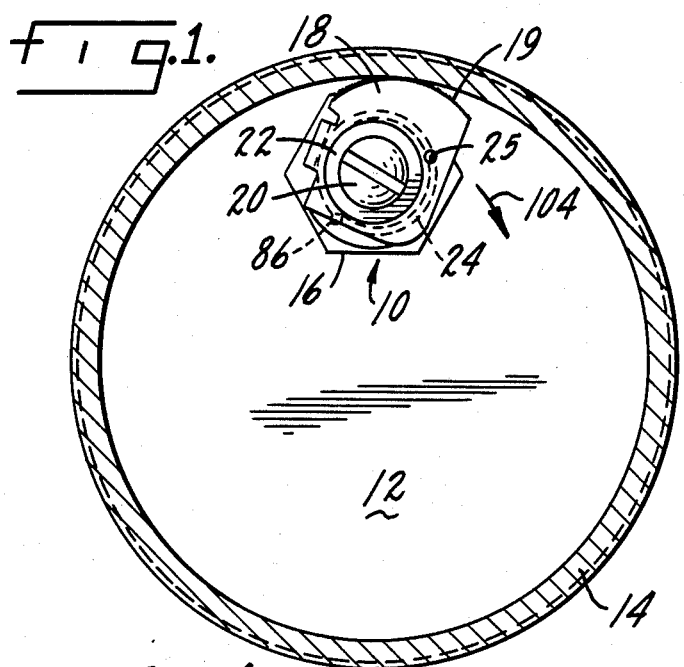
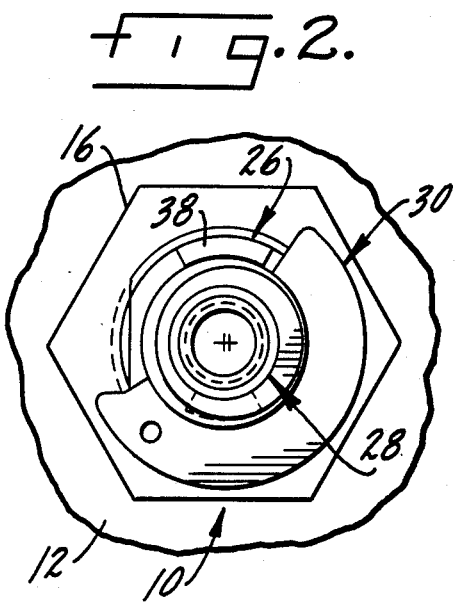
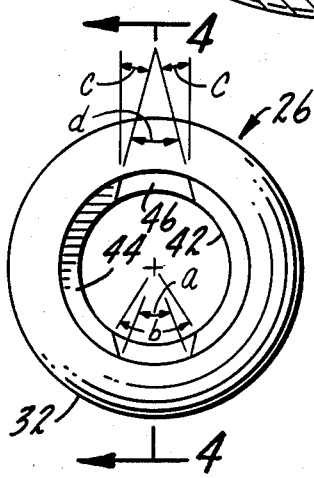
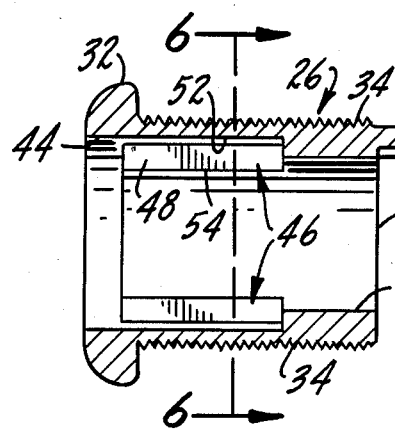
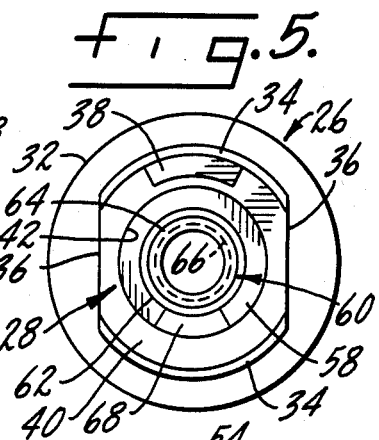
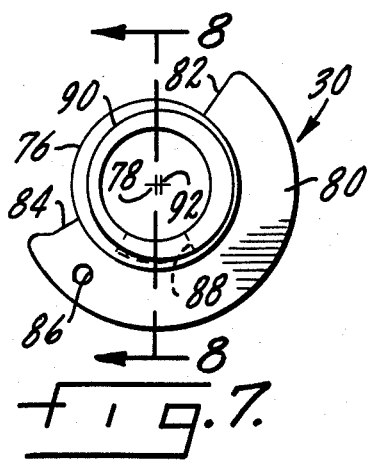
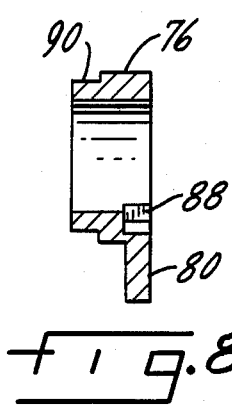
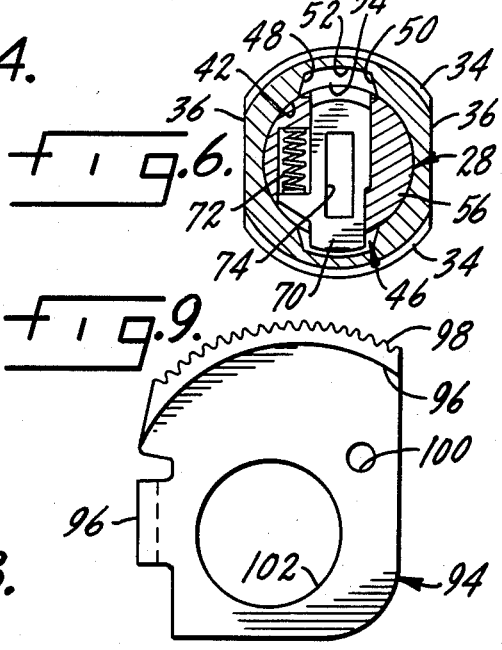

LOCK FOR FUEL FILLER CAP

SUMMARY OF THE INVENTION

This invention relates to locks for motor vehicle fuel filler caps. The invention is specifically concerned with an improved key-operated lock.

One of the objects of the invention is a key-operated lock having an improved keyway shape which permits easier insertion and removal of the key in the tumbler body by preventing interference of the keyway with the tumbler pins.

Another object of the invention is an improved mounting arrangement for the locking cam on the tumbler body whereby rotation of the tumbler body serves to assist in driving the locking cam away from the filler neck when the user unlocks the cap.

These and other objects are accomplished by providing a lock having a wide mouth opening for the keyway. Also the locking cam is mounted eccentrically with respect to the axis of rotation of the tumbler body so that when the tumbler is turned the locking cam is driven away from the locked position.

BRIEF DESCRIPTION OF THE DRAWINGS

FIG. 1 is a view looking out of the fuel tank filler neck at the bottom side of the lock and fuel cap.

FIG. 2 is a view on an enlarged scale, similar to FIG. 1 but with the locking cam and its retaining screw removed.

FIG. 3 is an end view of the lock housing.

FIG. 4 is a vertical section through the lock housing taken along line 4—4 of FIG. 3.

FIG. 5 is an end view of the lock housing and tumbler.

FIG. 6 is a section taken through the lock at the point indicated by line 6—6 of FIG. 4.

FIG. 7 is a plan view of the lock shifter.

FIG. 8 is a section of the lock shifter taken along line 8—8 of FIG. 7.

FIG. 9 is a plan view of an alternate embodiment of the locking cam.

DESCRIPTION OF THE PREFERRED EMBODIMENT

FIG. 1 shows the lock 10 of the present invention mounted on a fuel filler cap 12. The cap is attached to a filler neck 14. The lock 10 is connected to the cap 12 by a nut 16. A locking means in the form of a locking cam 18 has a roughened gripping surface 19 which is engageable with the interior surface of the filler neck. The surface 19 may be a flame sprayed coating having the texture of sandpaper. The gripping surface provides sufficient friction for the locking cam to hold or grab the interior wall of the filler neck. The locking cam 18 is secured to the lock by a screw 20 and washer 22. A torsion spring 24 has a finger engaging hole 25 in the cam to bias the locking cam 18 in a counterclockwise direction, looking at FIG. 1.

Further details of the lock can be seen in FIG. 2, wherein the locking cam 18, screw 20, washer 22 and torsion spring 24 have been removed to reveal parts underneath them. A hollow, generally cylindrical lock body is shown generally at 26. A tumbler body 28 is rotatably disposed in the lock body 26. A lock shifter 30 is mounted for rotation on the tumbler 28. These parts will now be described in detail.

Looking first at the lock body 26 in FIGS. 3-5, the body has an integral flange 32 and an external threaded portion 34. The nut 16 is threaded on the portions 34 and clamps the cap 12 between it and the flange 32 to hold the lock on the filler cap. The sides of the body 26 have flat surfaces 36 (FIG. 5). These surfaces engage a similarly shaped opening in the cap to prevent rotation of the lock body in the cap. An arcuate stop 38 protrudes from the end surface 40 of the body. A central bore 42 extends through the body 26 with a counter bore 44 formed at the flange end.

Two keyways 46 are cut in the surface of the bore 42. The keyways extend in a direction parallel to the axis of the bore. The keyways are defined by sidewalls 48 and 50, a root 52 and an open mouth 54. The root 52 connects the sidewalls and describes an arc whose radius is that of the counterbore 44. The mouth 54 is the opening defined by an imaginary arc connecting the interior edges of the sidewalls, the arc having a radius equal that of the bore 42. The shape of the keyway is an important aspect of the invention. The keyway sidewalls 48 and 50 are angled such that the mouth of the keyway is wider than the root. This is illustrated in the FIG. 3 where it will be noted that the central angle "a" subtended by the root 52 is less than the angle "b" subtended by the mouth. In a preferred embodiment the sidewalls are angled 15° from vertical. Thus, the angles "c" indicated at FIG. 3 are 15°. Also the angle "d" formed by the intersection of planes defined by the sidewalls is 30°. It will be noted that the sidewalls are angled outwardly toward the mouth of the keyway. Thus the planes defined by the sidewalls intersect at a line outside of the cylinder defined by the lock body.

The tumbler 28 is best seen in FIGS. 5 and 6. The tumbler includes a tumbler body 56 having an end face 58 which is essentially coextensive with the end face 40 of the lock body. A central stem 60 extends from the tumbler body. The stem has a chamfered edge 62, a top land 64 and an internal opening which is threaded as at 66. The screw 20 engages the thread 66 to hold the lock parts together. The end face 58 of the tumbler also has an arcuate projection 68.

The tumbler body 56 has a plurality of tumbler slots cut therein. Tumbler pins or plates 70 (FIG. 6) are mounted in the slots. Each tumbler pin has an associated spring 72 which urges one end of the pin into a keyway 46. Each pin 70 also has a key slot 74. When the key is inserted into the lock it extends through the key slot and engages one end of the slot to retract the pin from the keyway.

Turning now to FIGS. 7 and 8, details of the lock shifter 30 are shown. The lock shifter has a cylindrical core 76 whose center is shown at 78. Attached to the core 76 is an arcuate flange 80 having stop surfaces 82 and 84. The stop surfaces engage the stop member 38 on the body to limit the rotation of the tumbler. The flange also has a hole 86 for mounting the torsion spring 24. There is an arcuate slot 88 cut in the bottom side of the core. The lock shifter 30 fits over the stem 60 of the tumbler body with the stem fitting through the central opening of the core and the projection 68 fitting in the slot 88. The lock shifter rests on the faces 40 and 58 of the body and tumbler, respectively. The projection 68 and slot 88 cause the lock shifter and tumbler to rotate as a unit.

A circular boss 90 is formed on the upper surface of the core 76. The center 92 of the boss is offset from the center 78 of the core. Thus, the boss is eccentrically mounted with respect to the center of the lock shifter. Since the center 78 of the lock shifter coincides with the axis of rotation of the tumbler, the boss 90 is eccentric with respect to the tumbler axis of rotation.

An alternate form of the locking cam is shown in detail at 94 in FIG. 9. It includes a folded-under tab 96 which, when the lock is assembled, resides between the stop surfaces 82 and 84 of the lock shifter 30. The locking cam has a curved rim 96 on which are formed a plurality of teeth 98. The teeth are engagable with the filler neck. The teeth provide sufficient gripping force on the filler neck. A serrated rim could also be used instead of the teeth. A hole 100 is the counter-part of the hole 86 in the lock shifter. It accommodates the torsion spring 24. The torsion spring normally causes the lock shifter and locking cam to move as a unit. But if the locking cam binds on the filler neck before the tumbler has returned to the closed position, the spring will allow the tumbler to continue rotating to the fully closed position even though the locking cam is not able to move with it.

The locking cam also has an opening 102 sized to permit the cam to mount on the boss 90 of the lock shifter. Thus, the cam is mounted eccentrically to the tumbler axis of rotation. The eccentric mounting provides additional driving force when unlocking the lock. As the user turns the key and rotates the tumbler, the eccentric boss 90 will rotate in a manner which drives the locking cam out and away from the filler neck as indicated by the arrow 104 in FIG. 1. Thus, it can be seen that the cam motion relative to the filler neck has both a radial component and a tangential component. This compound motion is imparted by the eccentric boss. The compound motion makes the lock far easier to open and close. This is because the cam gripping surface actually contacts the filler neck only during a small portion of the open and close cycle. In contrast, if the eccentric mounting were not provided the cam would have only tangential motion and the gripping surface would have to contact the filler neck nearly all the time. Not only would this make operation of the lock difficult, it would also wear down the frictional engagement surfaces on the cam and filler neck. The present invention avoids these problems.

Another advantage of this invention is the ease of inserting and removing the key. With the keyways shaped as described, there will be a reduced chance of binding between the tumbler pins and the keyway. Thus, if the tumbler pins are not returned to an exactly centered position, the user will not encounter difficulty in subsequently inserting the key into the lock which would otherwise be caused by interference between the tumbler pins and the sidewalls of the keyway. This can be best seen in FIG. 6 where it will be noted that the keyway sidewalls are angled away from the tumbler pin. Even if the pin were off center and engaging a sidewall, the contact would only be at a point and not along the length of the sidewall and pin. The keyway feature is especially important in locks of this type wherein a friction fit between the locking cam and filler neck is used. Due to variations in the filler neck and in the location of the lock on the cap, the amount of tumbler rotation needed to close the lock cannot be precisely controlled. Thus, the tumbler pins may not always be exactly centered in the keyway when the key is removed. But the keyway of the present invention makes pin centering less critical because the keyway can accept off center pins and still not bind upon subsequent key insertion.

Whereas the preferred form of the invention has been shown and described, it will be understood that there may be modifications made therein without departing from the scope of the following claims.

It is claimed:

1. A lock for a fuel filler cap of the type used to close a fuel tank filler neck, comprising:
    a hollow, generally cylindrical body having an axial keyway formed therein;
    a tumbler body rotatably disposed in the body and mounting a plurality of tumbler plates which are slidable into and out of the keyway; and
    locking means eccentrically mounted on and rotatable with the tumbler body about a different axis from the tumbler axis of rotation, the locking means moving tangentially and radially to the fuel filler neck to releasably engage a fixed portion of the fuel filler neck.

2. The lock of claim 1 further comprising a lock shifter centrally mounted for rotation on an end of the tumbler body and having a boss which is eccentric with respect to the tumbler body's axis of rotation, the locking means being mounted on the boss.

3. The lock of claim 2 further comprising a torsion spring mounted between the locking means and the lock shifter.

4. The lock of claim 1 wherein the locking means has a roughened gripping surface.

5. The lock of claim 1 wherein the locking means has a plurality of teeth formed along one edge thereof.

* * * * *